(12) United States Patent
Tanaka et al.

(10) Patent No.: US 8,579,310 B2
(45) Date of Patent: Nov. 12, 2013

(54) VEHICLE SUSPENSION APPARATUS

(75) Inventors: Masaaki Tanaka, Hiroshima (JP); Shin Murata, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/807,257

(22) PCT Filed: Jun. 24, 2011

(86) PCT No.: PCT/JP2011/003632
§ 371 (c)(1),
(2), (4) Date: Dec. 27, 2012

(87) PCT Pub. No.: WO2012/001933
PCT Pub. Date: Jan. 5, 2012

(65) Prior Publication Data
US 2013/0099460 A1    Apr. 25, 2013

(30) Foreign Application Priority Data
Jun. 30, 2010  (JP) .................................. 2010-150049

(51) Int. Cl.
*B60G 11/22* (2006.01)
*B60G 11/24* (2006.01)
*B60G 3/18* (2006.01)

(52) U.S. Cl.
USPC ...... 280/124.135; 280/124.177; 280/124.136; 280/124.137; 280/124.138; 280/124.139; 280/124.109

(58) Field of Classification Search
USPC ...................... 280/124.109, 124.11, 124.128, 280/124.143, 124.135–124.139, 124.177
See application file for complete search history.

(56) References Cited

U.S. PATENT DOCUMENTS 4,807,901 A * 2/1989 Kondo ....................... 280/5.524
5,016,903 A * 5/1991 Kijima et al. .......... 280/124.134
(Continued)

FOREIGN PATENT DOCUMENTS

JP       59-087305        6/1984
JP    2003-104026 A       4/2003
(Continued)

OTHER PUBLICATIONS

International Search Report; PCT/JP2011/003632; Sep. 6, 2011.

*Primary Examiner* — Ruth Ilan
*Assistant Examiner* — Darlene P Condra
(74) *Attorney, Agent, or Firm* — Studebaker & Brackett PC (57) ABSTRACT

It is an object to obtain excellent suspension performance and effectively enhance steering stability during vehicle turning, with a simple configuration. A vehicle suspension apparatus comprises an upper lateral link (5) and a lower lateral link (6) each having one end (5a, 6a) swingably mounted to a wheel carrying member (1) and the other end (5b, 6b) swingably supported by a vehicle body, while being installed to extend in a vehicle widthwise direction, and a lower link (7) having one end mounted to a lower portion of the wheel carrying member (1) at a position rearward of a rotary shaft of a wheel, and the other end swingably supported by the vehicle body. The one ends (5a, 6a) of the upper and lower lateral links (5, 6) are mounted, respectively, to an upper portion and a lower portion of the wheel carrying member (1) at positions frontward of the rotary shaft of the wheel. The upper and lower mounting portions each mounting a respective one of the upper and lower lateral links (5, 6) to the wheel carrying member (1) are disposed at approximately same positions in a vehicle longitudinal direction in side view. Further, the other ends (5b, 5b) of the upper and lower lateral links (5, 6) are supported, respectively, by an upper portion and a lower portion of a frame member 3 installed to extend in an upward-downward direction in side view.

18 Claims, 10 Drawing Sheets

(56) References Cited

U.S. PATENT DOCUMENTS

| | | | |
|---|---|---|---|
| 5,683,098 A * | 11/1997 | VanDenberg | 280/124.116 |
| 5,685,556 A * | 11/1997 | Shibue et al. | 280/124.128 |
| 8,025,313 B2 | 9/2011 | Tanaka et al. | |
| 8,056,912 B2 * | 11/2011 | Kawabe et al. | 280/124.135 |
| 2009/0243272 A1 | 10/2009 | Tanaka et al. | |
| 2010/0001486 A1 * | 1/2010 | Natsukari et al. | 280/124.143 |

FOREIGN PATENT DOCUMENTS

| | | |
|---|---|---|
| JP | 2007-083773 A | 4/2007 |
| JP | 2009-255902 A | 11/2009 |

* cited by examiner

Fig. 11
TOE-IN ANGLE

Fig. 12

Fig. 13
TOE-IN ANGLE (INWARD)    0    (OUTWARD)   D

Fig. 14
TOE-IN ANGLE (−)    0    (+)   BUMP AMOUNT

Fig. 15
CAMBER ANGLE

Fig. 16
ROLL-CENTER HEIGHT

VEHICLE SUSPENSION APPARATUS

TECHNICAL FIELD

The present invention relates to a vehicle suspension apparatus which comprises a wheel carrying member adapted to rotatably carry a wheel, and a trailing arm having one end mounted to the wheel carrying member and the other end swingably supported by a vehicle body, while being installed to extend in a vehicle longitudinal direction.

BACKGROUND ART

Heretofore, in a vehicle suspension apparatus, as disclosed in Patent Literature "PTL1", which comprises: a wheel carrying member (wheel carrier) adapted to rotatably carry a wheel, a trailing arm extending in a vehicle longitudinal direction and having a rear end mounted to the wheel carrying member and a front end swingably supported by a vehicle body; a lateral link extending in a vehicle widthwise direction and having one end swingably supported by the wheel carrying member and the other end swingably mounted to a vehicle body; and a plurality of trailing-aim fastening portions provided in the wheel carrying member at respective positions, a technique has been implemented in which an opening is formed in a region of the wheel carrying member surrounded by the plurality of trailing-aim fastening portions, and a wall surface defining the opening is formed with a lateral-link mounting portion for mounting the lateral link thereto, so as to reliably support the lateral link without providing a separate link mounting bracket, while ensuring excellent layout capability.

CITATION LIST

Patent Literature

[PTL 1]
JP 2007-083773A

SUMMARY OF INVENTION

Technical Problem

In the vehicle suspension apparatus disclosed in the PTL 1, a lateral force input from the wheel can be stably supported by a pair of front and rear lateral links each disposed on an upper portion of the wheel carrying member, and a lower link disposed below the rear lateral link. Meanwhile, in view of enhancing steering stability during vehicle turning, it is desirable to allow a turning outer wheel (rear wheel located on an outer side during vehicle turning) to be displaced in a toe-in direction (direction causing toe-in). However, in the vehicle suspension apparatus disclosed in the PTL 1, this point is not considered at all.

In view of the above circumstance, the present invention is directed to providing a vehicle suspension apparatus capable of obtaining excellent suspension performance and effectively enhancing steering stability during vehicle turning, with a simple configuration.

Solution to Problem

In order to achieve the above object, the present invention provides a vehicle suspension apparatus (2) which comprises a wheel carrying member (1) adapted to rotatably carry a wheel, a trailing arm (4) having one end mounted to the wheel carrying member (1) and the other end swingably supported by a vehicle body, while being installed to extend in a vehicle longitudinal direction; and a subframe (3) adapted to couple right and left wheels together. The vehicle suspension apparatus further comprises: an upper lateral link (5) and a lower lateral link (6) each having one end (5a, 6a) swingably mounted to the wheel carrying member (1) and the other end (5b, 6b) swingably supported by the vehicle body, while being installed to extend in a vehicle widthwise direction; and a lower link (7) having one end mounted to a lower portion of the wheel carrying member (1) at a position rearward of a rotary shaft (S) of the wheel, and the other end swingably supported by the vehicle body, wherein: the one ends (5a, 6a) of the upper and lower lateral links (5, 6) are mounted, respectively, to an upper portion and a lower portion of the wheel carrying member (1) at positions frontward of the rotary shaft (S) of the wheel, wherein the upper and lower mounting portions (12, 16) each mounting a respective one of the upper and lower lateral links (5, 6) to the wheel carrying member (1) are disposed at approximately same positions in the vehicle longitudinal direction in side view; and the subframe (3) comprises a frame member, wherein each of opposite lateral ends of the frame member has an upwardly/downwardly extending section (31U, 31L) extending in an upward-downward direction in side view, and wherein the other ends (5b, 5b) of the upper and lower lateral links (5, 6) are supported, respectively, by an upper portion and a lower portion of the upwardly/downwardly extending section, wherein the upper and lower support portions (14, 18) each supporting a respective one of the upper and lower the lateral links (5, 6) to the frame member are disposed at approximately same positions in a vehicle longitudinal direction in side view.

In the present invention having the above feature, the one ends of the upper and lower lateral links each installed to extend in the vehicle widthwise direction are mounted, respectively, to an upper portion and a lower portion of the wheel carrying member at positions frontward of the rotary shaft of the wheel. The upper and lower mounting portions each mounting a respective one of the upper and lower lateral links to the wheel carrying member are disposed at approximately same positions in the vehicle longitudinal direction in side view. Further, the other ends of the upper and lower lateral links are supported, respectively, by an upper portion and a lower portion of the frame member installed to extend in an upward-downward direction in side view. The upper and lower support portions each supporting a respective one of the upper and lower lateral links to the frame member are disposed at approximately same positions in the vehicle longitudinal direction in side view. This provides an advantage of being able to allow a turning outer wheel (rear wheel located on an outer side during vehicle turning) to be biased in a toe-in direction during vehicle turning so as to effectively enhance vehicle steering stability.

BRIEF DESCRIPTION OF DRAWINGS

[FIG. 1]
[FIG. 2]
[FIG. 3]
[FIG. 4]

[FIG. 5]
[FIG. 6]
[FIG. 8]
[FIG. 9]
[FIG. 10]
[FIG. 11]
[FIG. 12]
[FIG. 13]
[FIG. 14]
[FIG. 15]
[FIG. 16]

DESCRIPTION OF EMBODIMENTS

Figure 1:
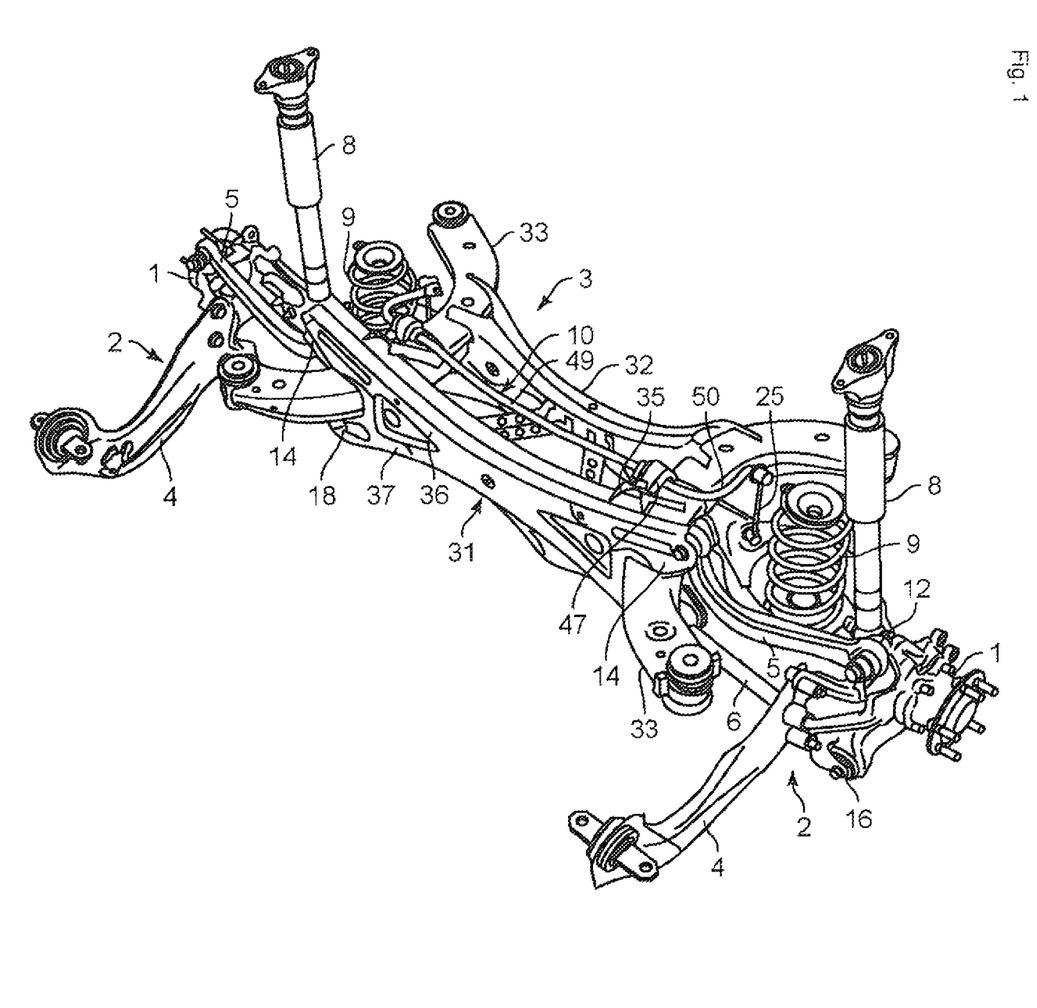
FIG. 1 is a perspective view illustrating a vehicle suspension apparatus according to one embodiment of the present invention.
Figure 2:
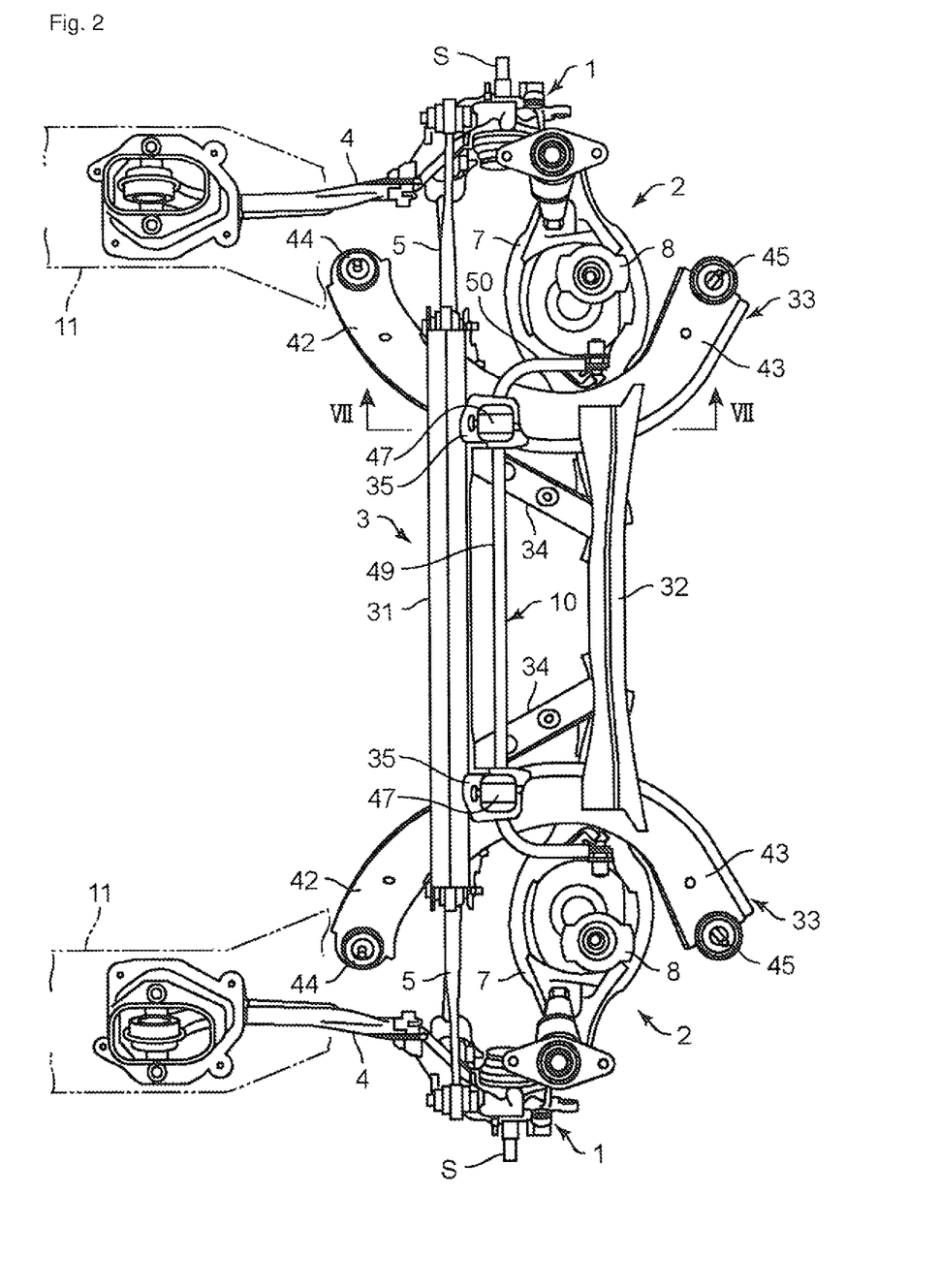
FIG. 2 is a top plan view of the suspension apparatus.
Figure 3:
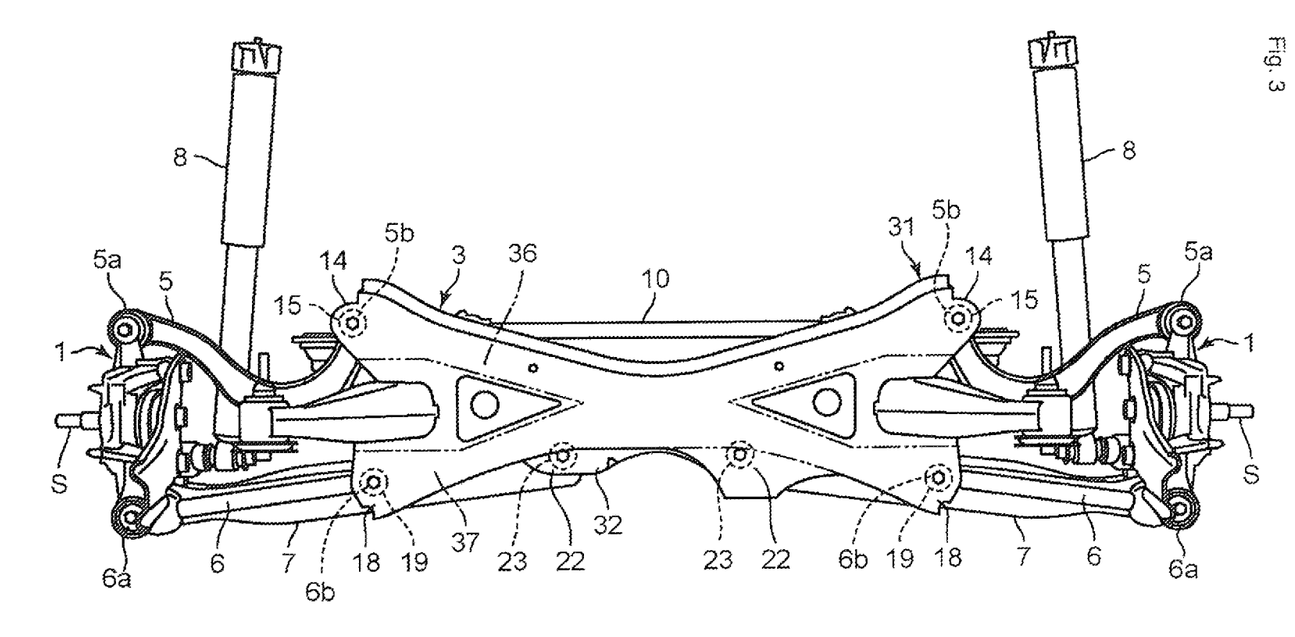
FIG. 3 is a front view of the suspension apparatus.

FIGS. 1 to 3 illustrate a vehicle suspension apparatus according to one embodiment of the present invention. The suspension apparatus comprises a wheel carrying member 1 made of a casting material or the like and adapted to rotatably carry a wheel consisting of a rear wheel of a vehicle, a pair of right and left wheel suspension members 2 each supporting the wheel carrying member 1, and a subframe 3 disposed in a rear of a vehicle body to couple the right and left wheel suspension members 2 together.

Each of the wheel suspension members 2 includes: a trailing arm 4 having one end 5a, 6a mounted to the wheel carrying member 1; an upper lateral link 5 and a lower lateral link 6 each having one end 5a, 6a swingably mounted to the wheel carrying member 1 and the other end (5b, 6b) swingably supported by the vehicle body, while being installed to extend in a vehicle widthwise direction; a lower link 7 disposed rearward of the upper and lower lateral links; a shock absorber 8 having a lower end supported by the wheel carrying member 1; a suspension spring 9 having a lower end supported by the lower link 7; and a stabilizer 10 installed to extend in the vehicle widthwise direction while passing above the subframe 3.

The trailing arm 4 is formed as a component prepared by subjecting a steel plate to press forming and installed to extend in a vehicle longitudinal direction. One end (rear end) of the trailing arm 4 is bolted to the wheel carrying member 1, and a front end (the other end) of the trailing arm 4 is supported by a rear side frame 11 constituting a frame of the vehicle body, through a rubber bush in an elastically displaceable manner.

Figure 4:
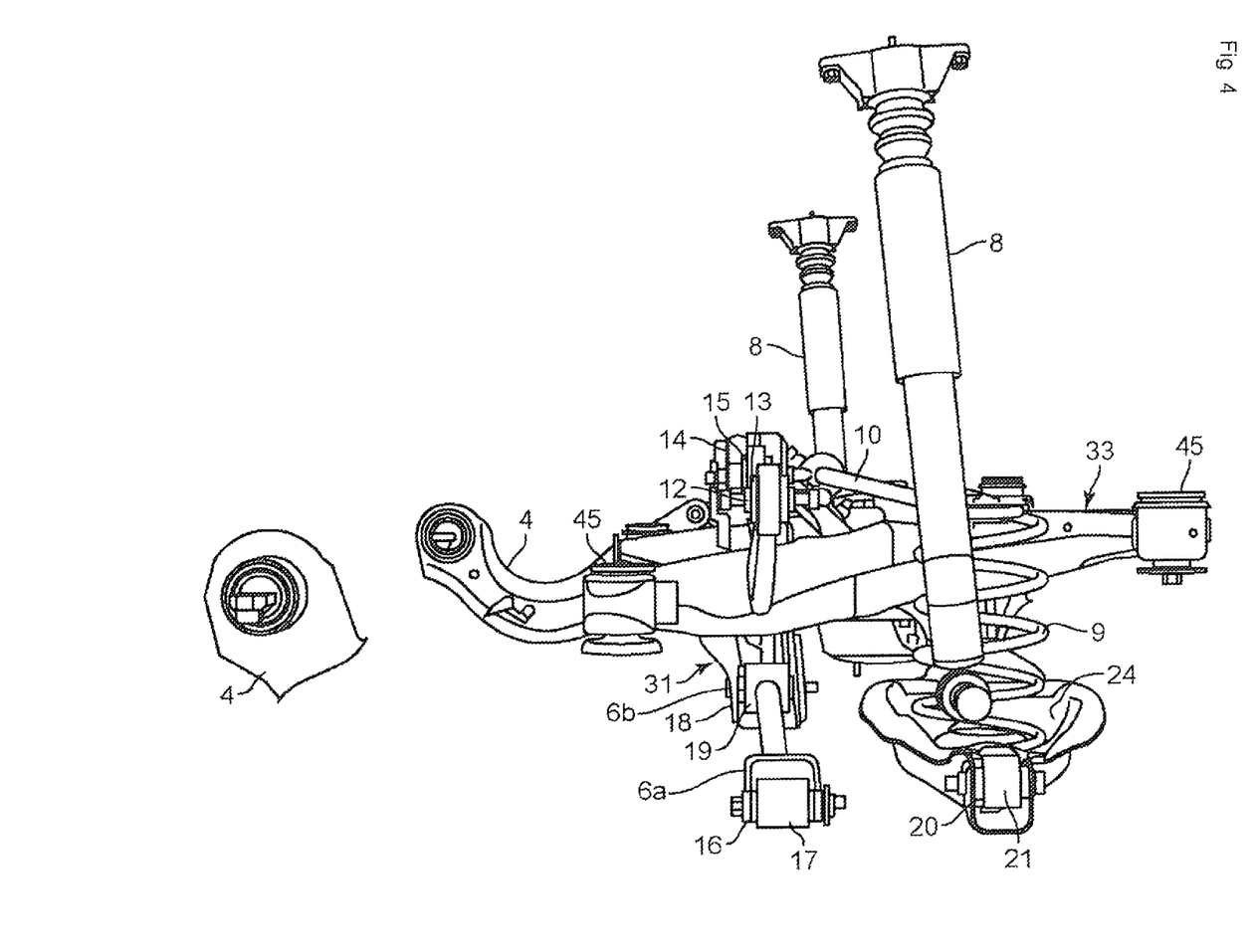
FIG. 4 is a side view of the suspension apparatus.
Figure 5:
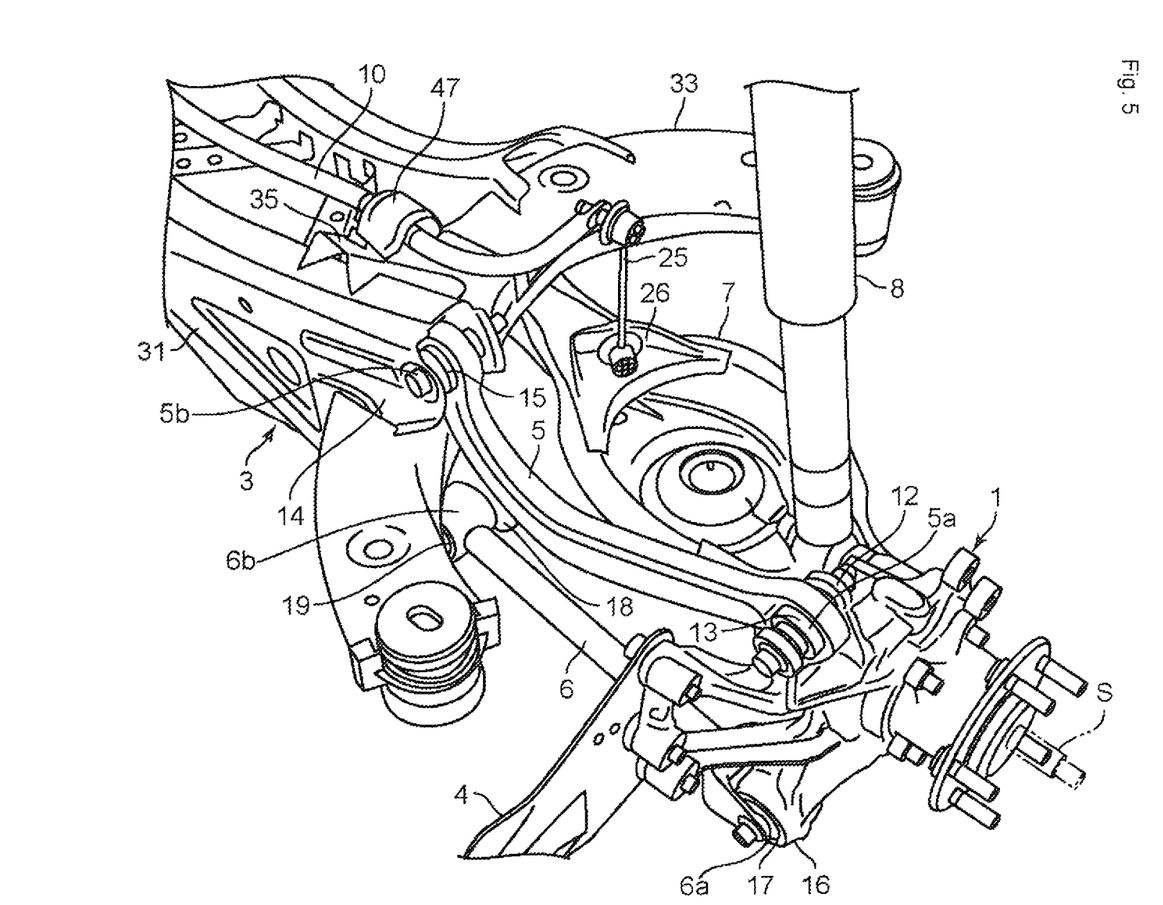
FIG. 5 is a perspective view illustrating a partial structure of the suspension apparatus.

As illustrated in FIGS. 3 to 5, etc., the lateral links 5, 6 are disposed, respectively, above and below a rotary shaft S of the wheel across the rotary shaft S. The one end 5a (vehicle-widthwise outer end) of the upper, first, lateral link 5 is mounted to a lateral-link mounting portion 12 provided in an upper portion of the wheel carrying member 1 at a position frontward of the rotary shaft S, through a rubber bush 13 in an elastically displaceable manner. The other end 5b (vehicle-widthwise inner end) of the first lateral link 5 is supported by a lateral-link support portion 14 provided in an upper portion of the subframe 3, through a rubber bush 15 in an elastically displaceable manner.

The other end 6a (vehicle-widthwise outer end) of the second lateral link 6 disposed below the rotary shaft S of the wheel is mounted to a lateral-link mounting portion 16 provided in a lower portion of the wheel carrying member 1 at a position frontward of the rotary shaft S, through a rubber bush 17 in an elastically displaceable manner. The other end 6b (vehicle-widthwise inner end) of the second lateral link 6 is swingably supported by a lateral-link support portion 18 provided in a lower portion of the subframe 3, through a rubber bush 19.

In side view, the lateral-link mounting portions 12, 16 provided in the wheel carrying member 1 are disposed above and below the rotary shaft S in spaced-apart relation to each other by a given distance, and disposed frontward of the rotary shaft S of the wheel and at approximately the same positions in the vehicle longitudinal direction. Similarly, in side view, the upper and lower lateral-link support portions 14, 18 provided in the subframe 3 are disposed above and below the rotary shaft S in spaced-apart relation to each other by a given distance, and disposed frontward of the rotary shaft S of the wheel and at approximately the same positions in the vehicle longitudinal direction.

One end (vehicle-widthwise outer end) of the lower link 7 is mounted to a lower-link mounting portion 20 provided in a lower portion of the wheel carrying member 1 at a position rearward of the rotary shaft S of the wheel, through a rubber bush 21 in an elastically displaceable manner. The other end (vehicle-widthwise inner end) of the lower link 7 is supported by a lower-link support portion 22 provided in a rear portion of the subframe 3, through a rubber bush 23 in an elastically displaceable manner.

Each of the rubber bushes 21, 23 provided in the mounting portion 20 and the support portion 22 for the lower link 7 has a hardness set to a highest value, i.e., a first hardness, and each of the rubber bushes 17, 19 provided in the mounting portion 16 and the support portion 18 for the second lateral link 6 has a hardness set to a lowest value, i.e., a second hardness. Further, each of the rubber bushes 13, 15 provided in the mounting portion 12 and the support portion 14 for the first lateral link 5 has a hardness set to an intermediate value between the first hardness and the second hardness.

The lower link 7 has a concave portion 24 formed to support the lower end of the suspension spring 9. The suspension spring 9 is disposed to extend between the concave portion 24 and the rear side frame 11 located above the concave portion 24. The lower link 7 also has a lock portion 26 which locks a lower end of a coupling link 25 provided at each of opposite lateral (vehicle-widthwise outer) ends of the stabilizer 10 (see FIG. 5). The lock portion 26 for the stabilizer 10 is disposed at a vehicle-widthwise inner position with respect to the upper and lower lateral-link support portions 14, 18 provided in the subframe 3, to rollably support a ball joint provided at the lower end of the coupling link 25.

The shock absorber 8 is installed at a position rearward of the rotary shaft S of the wheel to extend in an upward-downward direction in a posture inclined frontwardly by a given angle. The lower end of the shock absorber 8 is rigidly joined to the wheel carrying member 1 by bolting, and an upper end of the shock absorber 8 is supported by a strut tower (not illustrated) constituting the frame of the vehicle body, through a rubber insulator or the like.

As illustrated in FIGS. 1 and 2, etc, the subframe 3 includes: a front cross member 31 installed to extend in the vehicle widthwise direction at a position frontward of the rotary shaft S of the wheel; a rear cross member 32 installed to extend in the vehicle widthwise direction at a position rearward of the rotary shaft S; a pair of right and left side members 33 each extending from a respective one of opposite vehicle-widthwise outer ends of each of the front and rear cross members, in the vehicle longitudinal direction; a pair of right and left connection members 34 each connecting the front cross member 31 and the rear cross member 32 at a vehicle-widthwise inner position with respect to a corresponding one of the side members 33; and a pair of right and left reinforcing members 35 each reinforcing a coupling section between the front cross member 31 and a respective one of the side members 33.

Figure 6:
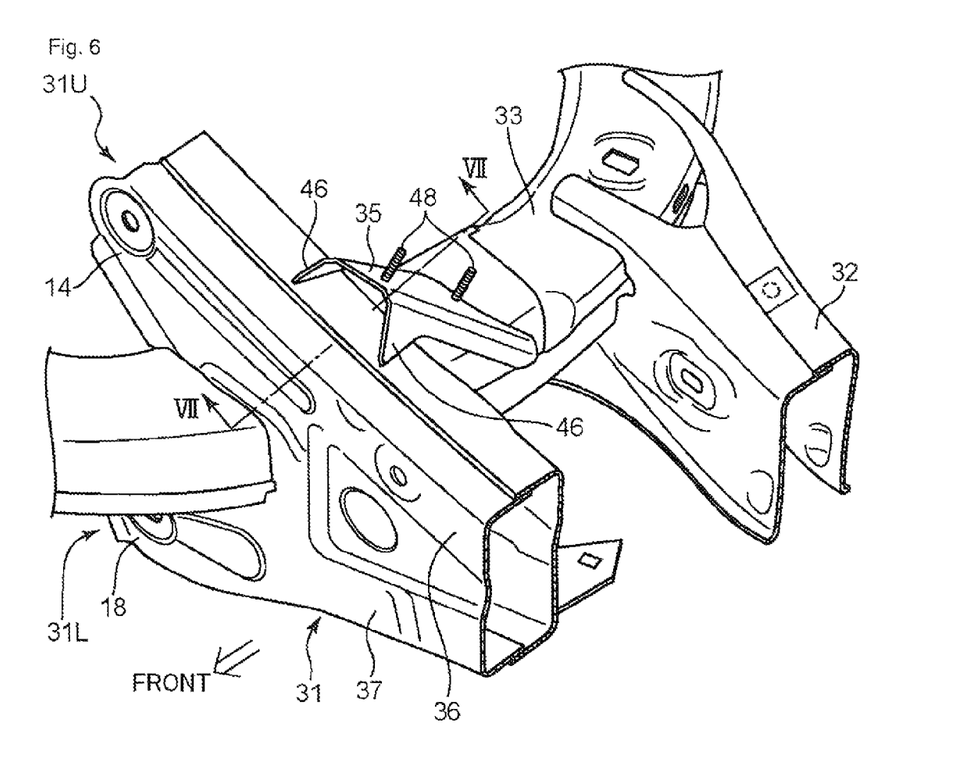
FIG. 6 is perspective view illustrating a specific structure of a reinforcing member,
[FIG. 7]

As illustrated in FIG. 3, in front view, the front cross member 31 includes a first front cross member 36 extending obliquely to couple the upper lateral-link support portion 14 provided on a left side of the front cross member 31 and the lower lateral-link support portion 18 provided on a right side of the front cross member 31, and a second front cross member 37 extending obliquely to couple the upper lateral-link support portion 14 provided on the right side of the front cross member 31 and the lower lateral-link support portion 18 provided on the left side of the front cross member 31. Thus, the first and second front cross members 36, 37 intersect to form an X shape in front view. Respective lateral ends of the first and second front cross members 36, 37 are installed in spaced-apart relation to each other by a given distance in an upward-downward direction, in side view, so that an upwardly/downwardly extending section 31U, 31L extending in the upward-downward direction in side view is formed at each of opposite lateral ends of the front cross member 31 (frame member), as illustrated in FIG. 6. As used herein, the term "upwardly/downwardly extending" means that, each of the ends of the front frame member 31 extends obliquely upwardly and obliquely downwardly in the vehicle widthwise direction, with respect to a vehicle-widthwise central portion thereof. As illustrated in FIG. 2, the front cross member 31 and each of the lateral links 5, 6 are disposed to extend in the vehicle widthwise direction.

The rear cross member 32 is installed to extend in the vehicle widthwise direction in such a manner as to couple the right and left side members 33. Further, the pair of right and left lower-link support portions 22 are provided in the rear cross member 32, and the vehicle-widthwise inner end of the lower link 7 is swingably supported by each of the right and left lower-link support portions 22 through the rubber bush 23 (see FIG. 3).

Each of the side members 33 of the subframe 3 is installed to extend in the vehicle longitudinal direction while passing between the upper and lower lateral-link support portions 14, 18 provided at a corresponding one of the lateral ends of the front cross member 31. The side member 33 is connected to respective lateral ends of the front cross member 31 and the rear cross member 32, so that the front cross member 31 and the rear cross member 32 are coupled together by the side member 33.

The side member 33 has a front portion 42 provided to protrude frontwardly and outwardly from the lateral end of the front cross member 31, and a rear portion 43 provided to protrude rearwardly and outwardly from the lateral end of the rear cross member 32. Thus, in front view, the side member 33 is formed in a semi-circular shape having a longitudinally central portion curved concavedly and inwardly in the vehicle widthwise direction. Further, a front mount portion 44 and a rear mount portion 45 are provided, respectively, at distal ends of the front portion 42 and the rear portion 43, and the side member 33 is connected to the lateral ends of the front and rear cross members 31, 32 at a position where the side member 33 is concavedly curved inwardly with respect to the front and rear mount portions 44, 45 in the vehicle widthwise direction.

Figure 7:
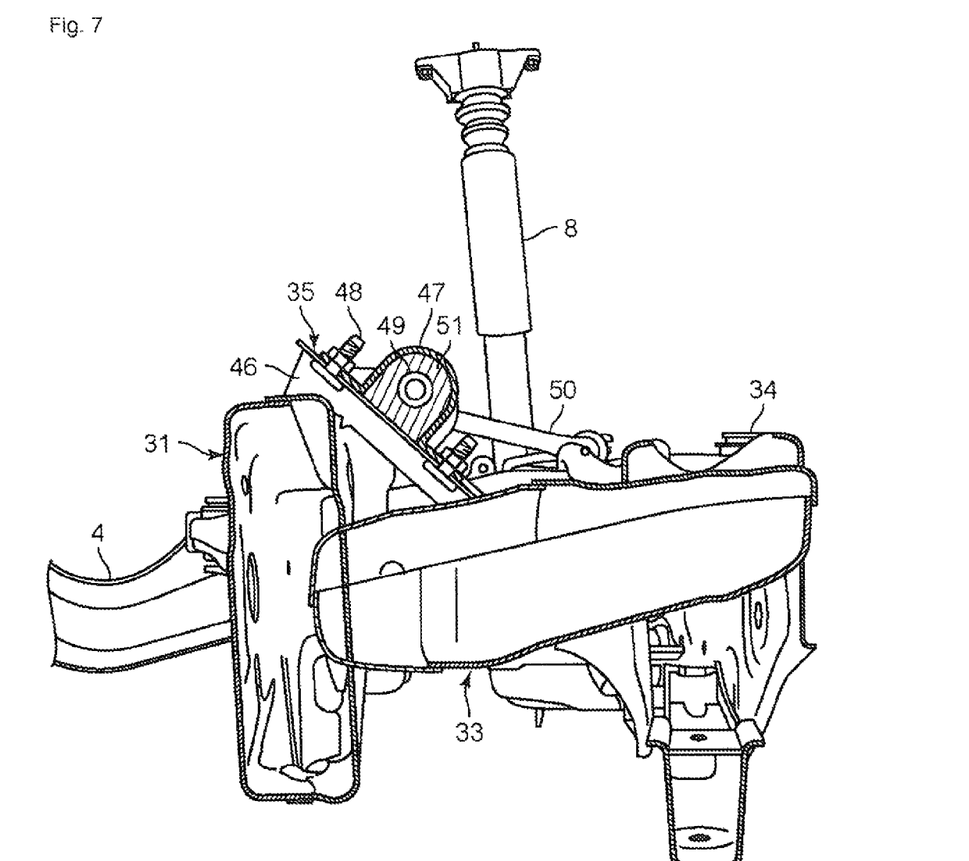
FIG. 7 is a sectional view taken along the line VII-VII in FIG. 2.

As illustrated in FIGS. 6 and 7, the upper lateral-link support portion 14 or a vicinity thereof, and the side member 33, are coupled together through the reinforcing member 35 provided on a top portion of the front cross member 31, so that a coupling section between the front cross member 31 and the side member 33 is reinforced. More specifically, a triangular pawl-shaped protrusion 46 provided in a front portion of the reinforcing member 35 is joined to a top surface and a rear surface of the front cross member 31, and a rear portion of the reinforcing member 35 is joined to a top surface and a vehicle-widthwise inner side surface of the side member 33. In this manner, a coupling section between a vicinity of the upper lateral-link support portion 14 provided in an upper portion of the lateral end of the front cross member 31, and a top surface portion of the side member 33, is reinforced.

Further, a mounting bolt 48 is provided to protrude from a top surface of the reinforcing member 35 so as to allow a support bracket 47 of the stabilizer 10 to be mounted to the top surface. In top plan view, the stabilizer 10 has a stabilizer body 49 installed to extend in the vehicle widthwise direction, and a pair of right and left extension portions 50 each provided to extend from a respective one of opposite right and left ends of the stabilizer body 49, in the vehicle longitudinal direction. Each of the right and left ends of the stabilizer body 49 is rollably supported by a support member 51 which is fixed to the top surface of the reinforcing member 35 through the support bracket 47.

The extension portion 50 of the stabilizer 10 and the lock portion 26 of the lower link 7 are coupled together through the coupling link 25. Thus, each of opposite vehicle-widthwise ends of the stabilizer 10 can be locked to the wheel suspension member 2 at a vehicle-widthwise inner position with respect to the upper and lower lateral-link support portions 14, 18 of the front cross member 31. Then, an external force, such as a push-up force, input into one of the right and left lower links 7 during vehicle running is transmitted to the other lower link 7 via the stabilizer 10 and the right and left coupling links 25, to suppress inclination of the vehicle body during vehicle turning.

As above, the vehicle suspension apparatus according to the above embodiment comprises: a wheel carrying member 1 adapted to rotatably carry a wheel; a trailing arm 4 having one end mounted to the wheel carrying member 1 and the other end swingably supported by a vehicle body, while being installed to extend in a vehicle longitudinal direction; an upper lateral link 5 and a lower lateral link 6 each having one end (5a, 6a) swingably mounted to the wheel carrying member 1 and the other end (5b, 6b) swingably supported by the vehicle body, while being installed to extend in a vehicle widthwise direction: and a lower link 7 having one end mounted to a lower portion of the wheel carrying member 1 at a position rearward of a rotary shaft S of the wheel, and the other end swingably supported by the vehicle body. The one ends 5a, 6a of the upper and lower lateral links 5, 6 are mounted, respectively, to an upper portion and a lower portion of the wheel carrying member 1 at positions frontward of the rotary shaft S of the wheel. The upper and lower mounting portions 12, 16 each mounting a respective one of the upper and lower lateral links 5, 6 to the wheel carrying member 1 are disposed at approximately same positions in the vehicle longitudinal direction in side view. Further, the other ends of the upper and lower lateral links 5, 6 are supported, respectively, by an upper portion (of an upwardly extending sub-section 31U) and a lower portion (of a downwardly extending sub-section 31L) in an upwardly/downwardly extending section of a frame member extending in an upward-downward direction in side view. The upper and lower support portions 14, 18 each supporting a respective one of the upper and lower lateral links to the frame member are disposed at approximately same positions in the vehicle longitudinal direction in side view. This provides an advantage of being able to obtain excellent suspension performance and effectively enhance steering stability during vehicle turning, with a simple structure.

Specifically, in the above embodiment, a pair of upper and lower lateral-link support portions 14, 18 are provided at each of opposite right and left ends of the front cross member 31 constituting the subframe 3 installed to couple the right and left wheel suspension members 2, and one end of the lower link 7 disposed rearward of the upper and lower lateral-link support portions 14, 18 is swingably supported by the vehicle body at a position rearward of the rotary shaft S of the wheel, so that vehicle steering stability can be effectively enhanced by biasing a turning outer wheel (rear wheel located on an outer side during vehicle turning), toward a toe-in direction, during vehicle turning. As used here, the term "toe-in" means that a front end (called "toe") of a tire is moved into an inward side of a vehicle body on the basis of a state when the vehicle body is oriented in a traveling direction. Conversely, a state when the toe is moved outwardly is referred to as "toe-out".

Figure 8:
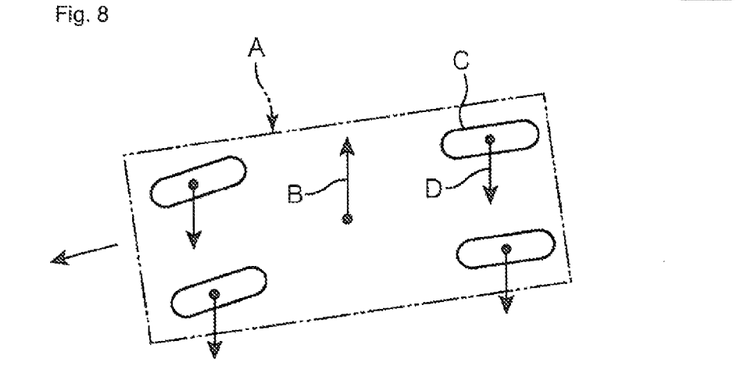
FIG. 8 is an explanatory diagram illustrating a state of action of cornering force.
Figure 9:
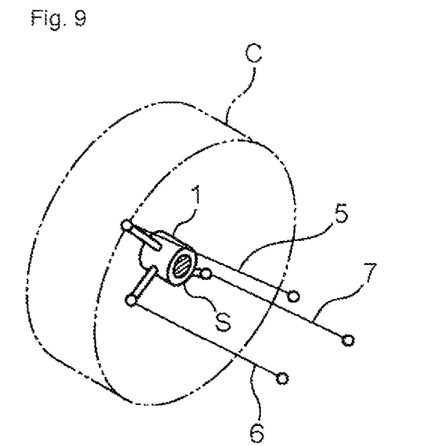
FIG. 9 is a perspective view illustrating a schematic configuration of a turning outer wheel.
Figure 10:
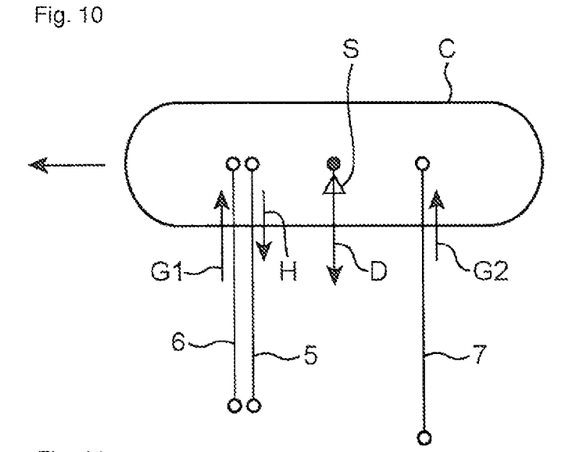
FIG. 10 is a top plan view illustrating a state when stress acts on a turning outer wheel, in the embodiment of the present invention.

For example, as illustrated in FIG. 8, in a situation where a vehicle is turning counter-clockwise, an centrifugal force B causing a vehicle body A to be moved rightwardly, and a cornering force D biasing a tire ground point of each wheel inwardly against the centrifugal force B, act on the vehicle. Thus, as illustrated in FIGS. 9 and 10, according to the cornering force D acting on a turning outer wheel C which is a rear wheel located on an outer side with respect to a turning direction, a compression stress G1 and a compression stress G2 are produced, respectively, in a second lateral link 6 and a lower link 7 each located below a rotary shaft S of the turning outer wheel C serving as a support point, and a tensile stress H is produced in a first lateral link 5 located above the rotary shaft S.

In the top plan view illustrated in FIG. 10, in the second lateral link 6 disposed below the first lateral link 5 and frontward of the rotary shaft S, the compression stress G1 is produced correspondingly to both the cornering force D and the tensile stress H acting on the first lateral link 5. Differently, in the lower link 7 disposed rearward of the rotary shaft S, the compression stress G2 is produced correspondingly to only the cornering force D, i.e., a stress having a value less than the compression stress G1 acting on the second lateral link 6 is produced. Specifically, most of the tensile stress H acting on the first lateral link 5 corresponds to the compression stress G1 of the second lateral link 6 located closer to the first lateral link 5 than the lower link 7 in the vehicle longitudinal direction, and thereby the compression stress G1 of the second lateral link 6 becomes greater than the compression stress G2 of the lower link 7.

As above, based on balance in rotation moment about an installation location of the rotary shaft S, the compression stress G1 greater than that in the lower link 7 located rearward of the rotary shaft S is produced in the second lateral link 6 located frontward of the rotary shaft S. Thus, rubber bushes 17, 19 provided in the second lateral link 6 is compressively deformed more largely than rubber bushes 21, 23 provided in the lower link 7, and thereby the turning outer wheel C is displaced in a toe-in direction.

Figure 11:
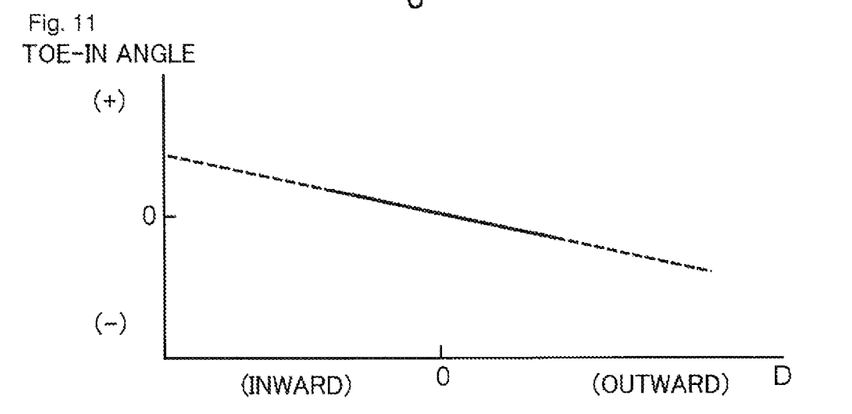
FIG. 11 is a graph illustrating a toe-in characteristic of the turning outer wheel in the embodiment of the present invention.

Based on stress calculation, it was tested how a toe-in angle of the turning outer wheel C is changed along with an increase in inward cornering force D acting on the turning outer wheel C. As a result, it was ascertained that the toe-in angle of the turning outer wheel C is changed to a plus direction along with an increase in the inward cornering force D, as shown in FIG. 11.

Figure 12:
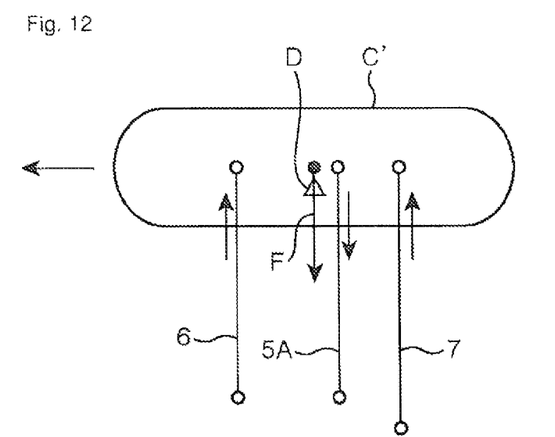
FIG. 12 is a top plan view illustrating a state when stress acts on a turning outer wheel in a comparative example.

On the other hand, using a comparative example where a first lateral link 5A is disposed at a position between the second lateral link 6 and the lower link 7 and closer to the lower link 7, i.e., disposed slightly rearward of the rotary shaft S, as illustrated in FIG. 12, it was tested how the toe-in angle of the turning outer wheel C is changed along with an increase in inward cornering force D acting on the turning outer wheel C, based on stress calculation. As a result, it was ascertained that the toe-in angle of the turning outer wheel C is apt to be changed to a minus direction along with an increase in the inward cornering force D, as shown in FIG. 13.

Figure 14:
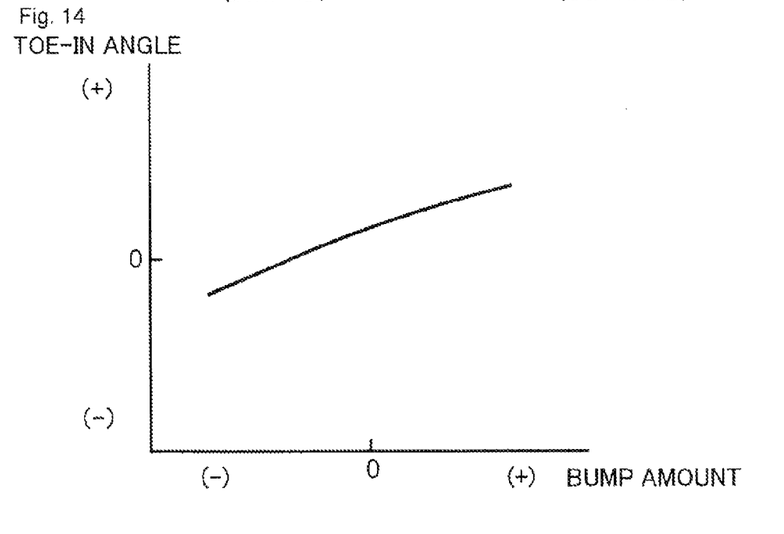
FIG. 14 is a graph illustrating a correspondence relationship between a wheel bump amount and a toe-in angle of a wheel.
Figure 15:
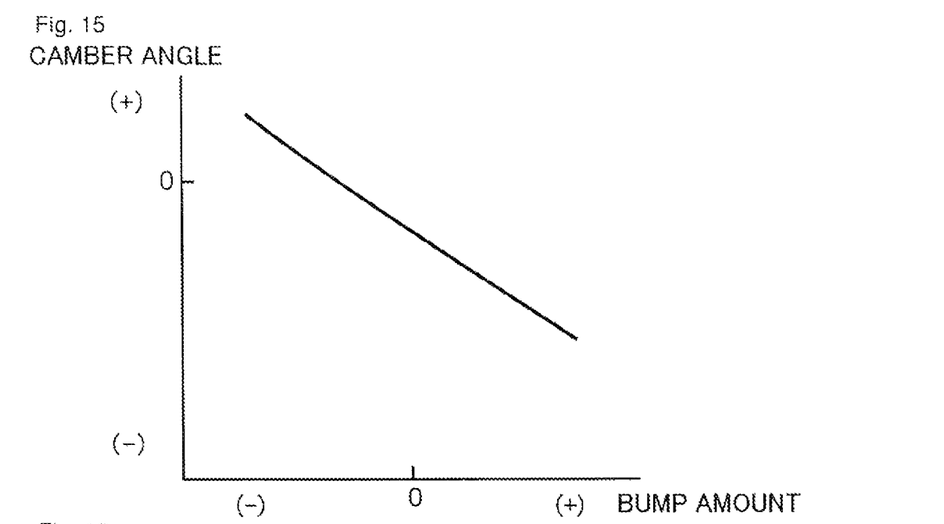
FIG. 15 is a graph illustrating a correspondence relationship between a wheel bump amount and a camber angle of a wheel.
Figure 16:
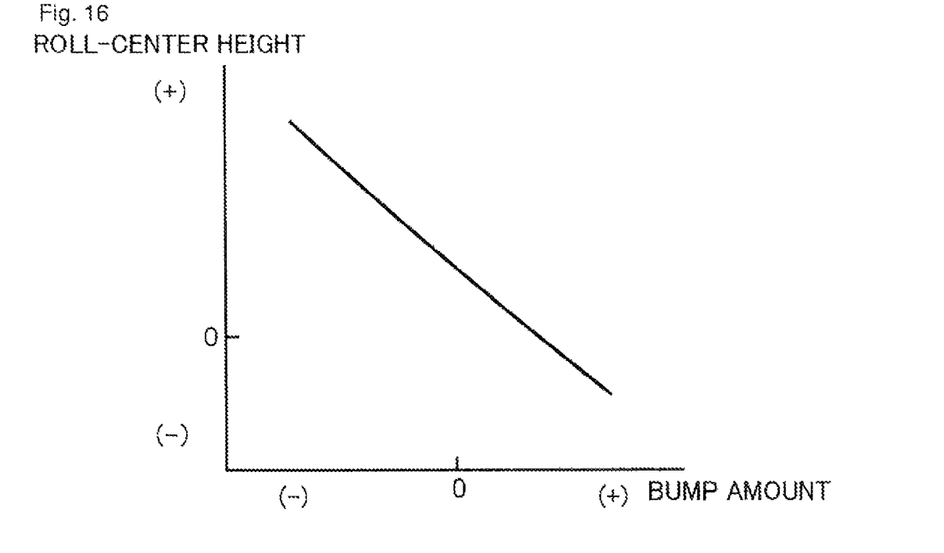
FIG. 16 is a graph illustrating a correspondence relationship between a wheel bump amount and a roll-center height.

As mentioned above, in the above embodiment, the one ends 5a, 5b of the first and second lateral links 5, 6 are mounted to respective ones of the upper and lower portions of the wheel carrying member 1 at a position frontward of the rotary shaft S of the wheel. The upper and lower mounting portions 12, 16 for mounting the upper and lower lateral links 5, 6 to the wheel carrying member 1 are disposed at approximately the same positions in the vehicle longitudinal direction in side view. Similarly, in side view, the lateral-link support portions 14, 18 provided in the subframe 3 are disposed above and below the rotary shaft S of the wheel in spaced-apart relation to each other by a given distance, and disposed frontward of the rotary shaft S and at approximately the same positions in the vehicle longitudinal direction. This also provides an advantage of being able to perform an operation such as design change or tuning for optimizing a change in geometry of the suspension apparatus during wheel bump, in an easy and adequate manner. Specifically, in order to effectively improve vehicle ride quality, it is desirable to set a correspondence relationship between a wheel bump amount and a toe-in angle, a correspondence relationship between the wheel bump amount and a camber angle, and a correspondence relationship between the wheel bump amount and a roll-center height, in respective manners as illustrated in FIG. 14, FIG. 15 and FIG. 16. The term "camber angle" means an angle at which an upper portion of a tire is inclined outwardly or inwardly (inverted V shape), when viewed from a front of a vehicle. An outwardly-inclined angle is called, "positive camber", and an inwardly-inclined angle is called, "negative camber". The term "roll center" means a center of rolling (: rolling about a segment line extending in a vehicle traveling direction) of a vehicle body, when viewed from a front (or rear) of a vehicle, and the term "roll-center height" means a height of the roll center.

Figure 13:
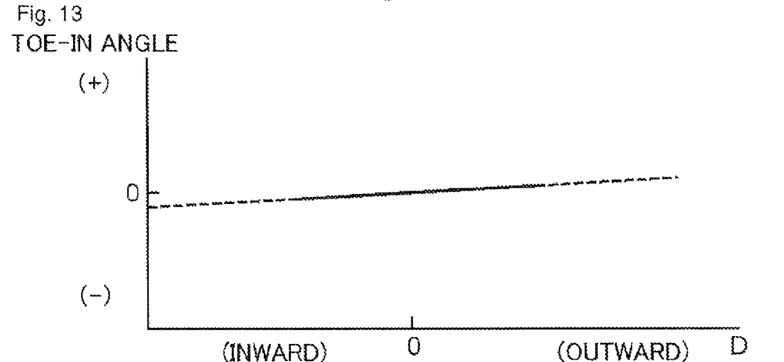
FIG. 13 is a graph illustrating a toe-in characteristic of the turning outer wheel in the comparative example.

In a conventional apparatus where the first lateral link 5A is disposed between the second lateral link 6 and the lower link 7, when one of respective installation positions, lengths or the like of the first lateral link 5A, the second lateral link 6 and the lower link 7 is changed to set the correspondence relationship between the wheel bump amount and the toe-in angle to an adequate value as illustrated in FIG. 13, the correspondence relationship between the wheel bump amount and the camber angle and the correspondence relationship between the wheel bump amount and the roll-center height will be inevitably changed. Thus, if these relationships become inadequate, it is necessary to restart the design from the beginning. Moreover, it is extremely difficult to set all of the relationships to adequate values.

In contract, in the above embodiment, the one ends 5a, 5b of the first and second lateral links 5, 6 are mounted to respective ones of the upper and lower portions of the wheel carrying member 1 at a position frontward of the rotary shaft S of the wheel. The upper and lower mounting portions 12, 16 for mounting the upper and lower lateral links 5, 6 to the wheel carrying member 1 are disposed at approximately the same positions in the vehicle longitudinal direction in side view. Similarly, in side view, the lateral-link support portions 14, 18 provided in the subframe 3 are disposed above and below the rotary shaft S of the wheel in spaced-apart relation to each other by a given distance, and disposed frontward of the rotary shaft S and at approximately the same positions in the vehicle longitudinal direction. Further, the lower link 7 is disposed rearward of the rotary shaft S. In this case, even if one of respective installation positions, lengths or the like of the first to third lateral links 5 to 7 is changed to set a certain characteristic to an optimal value, the remaining characteristics will not be largely changed, which provides an advantage of being able to facilitate the above operation such as design change.

As disclosed in the above embodiment, a frame member comprised of the front cross member 31 of the subframe 3 disposed to extend in the vehicle widthwise direction comprises a first front cross member 36 and a second front cross member 37 arranged to intersect to form an X shape in front view, and the upper and lower lateral-link support portions 14, 18 are disposed at each of opposite right and left end regions of the first and second front cross members 36, 37. This provides an advantage of being able to effectively enhance the rigidity in the vehicle widthwise direction In the above configuration, for example, during clockwise vehicle turning, a load is applied to the left lower lateral-link support portion 18 in a direction causing the front cross member 31 to be compressed, and simultaneously a load is applied to the right upper lateral-link support portion 14 located in diagonal relation to the left lower lateral-link support portion 18, in a direction causing the front cross member 31 to be compressed, so that the two loads will be canceled out. Further, a load is applied to the left upper lateral-link support portion 14 in a direction causing the front cross member 31 to be tensioned, and simultaneously a load is applied to the right lower lateral-link support portion 18 located in diagonal relation to the left upper lateral-link support portion 14, in a direction causing the front cross member 31 to be tensioned, so that the two loads will be canceled out. This provides an advantage of being able to effectively support input loads from the right and left wheel suspension members 2, while simplifying a structure of the front cross member 31.

As disclosed in the above embodiment, the pair of right and left side members 33 each extending from a respective one of opposite right and left edges of the front cross member 31, in a vehicle longitudinal direction, and a rear cross member 32 extending in the vehicle widthwise direction to couple respective rear portions of the side members 33, are provided, and the lower link 7 is swingably supported by the rear cross member 32. This provides an advantage of stably support a load input from the lower link 7 into the subframe 3, with a simple configuration.

In the above embodiment, each of the rubber bushes 21, 23 provided in the mounting portion 20 and the support portion 22 for the lower link 7 has a hardness set to a highest value, i.e., a first hardness, and each of the rubber bushes 17, 19 provided in the mounting portion 16 and the support portion 18 for the second lateral link 6 has a hardness set to a lowest value, i.e., a second hardness. Further, each of the rubber bushes 13, 15 provided in the mounting portion 12 and the support portion 14 for the first lateral link 5 has a hardness set to an intermediate value between the first hardness and the second hardness. Thus, the second lateral link 6 disposed below and frontward of the rotary shaft of the wheel can be most largely elastically deformed to allow a turning outer wheel to be more effectively displaced to a toe-in position during vehicle turning.

However, it is not essential to set hardness of each of the rubber bushes 13, 15, 17, 19, 21, 23 provided in the mounting portion 12 and the support portion 14 for the first lateral link 5, the mounting portion 16 and the support portion 18 for the second lateral link 6, and the mounting portion 20 and the support portion 22 for the lower link 7, in the above manner. For example, only the rubber bushes 13, 17, 21 provided in the mounting portion 12 for the first lateral link 5, and the mounting portion 16 for the second lateral link 6 and the mounting portion 20 for the lower link 7 may be designed to become different from each other in hardness. Conversely, only the rubber bushes 15, 19, 23 provided in the support portion 14 for the first lateral link 5, the support portion 18 for the second lateral link 6, and the support portion 22 for the lower link 7 may be designed to become different from each other in hardness. Even in these structures, it is possible to allow a turning outer wheel to be effectively displaced to a toe-in position during vehicle turning.

In the above embodiment, a stabilizer 10 is installed to the frame member comprised of the front cross member 31 of the subframe 3, in such a manner as to extend in the vehicle widthwise direction so as to couple the right and left wheel suspension members 2 together, and each of opposite right and left ends of the stabilizer 10, specifically, a distal end of each of the extension portions 50, is coupled to a respective one of the lower links 7 through a coupling link 25. This provides an advantage of being able to adequately install the coupling link 25 by effectively utilizing a space formed on a rear side of the wheel carrying member 1 based on the arrangement where the first lateral link 5 is disposed frontward of the wheel carrying member 1.

In the above embodiment, a shock absorber 8 is installed to extend in an upward-downward direction at a position rearward of the rotary shaft of the wheel, and a lower end of the shock absorber 8 is supported by the wheel carrying member 1, so that it becomes possible to sufficiently ensure an installation space of the shock absorber 8, by effectively utilizing the space formed on the rear side of the wheel carrying member 1 based on the arrangement where the first lateral link 5 is disposed frontward of the wheel carrying member 1. In addition, it is not necessary to change an installation position of the shock absorber 8 between a rear-wheel-drive or four-wheel-drive vehicle having a need for transmitting a driving force of an engine to rear wheels, and a front-wheel-drive vehicle free of the need for transmitting a driving force of an engine to rear wheels, so that it becomes possible to allow the suspension apparatus to have versatility as a rear-wheel suspension apparatus.

Particularly, as disclosed in the above embodiment, the shock absorber 8 is installed in a frontwardly-inclined posture by utilizing the space formed on the rear side of the wheel carrying member 1. For example, this provides an advantage of effectively enhance vehicle ride quality with a simple configuration, by using the shock absorber 8 as a damping member against up-and-down vibration input from a rear wheel suspension member 2, while effectively compactifying an installation space of the shock absorber 8.

As described above, the present invention provides a vehicle suspension apparatus (2) which comprises a wheel carrying member (1) adapted to rotatably carry a wheel, a trailing arm (4) having one end mounted to the wheel carrying member (1) and the other end swingably supported by a vehicle body, while being installed to extend in a vehicle longitudinal direction; and a subframe (3) adapted to couple right and left wheels together. The vehicle suspension apparatus further comprises: an upper lateral link (5) and a lower lateral link (6) each having one end (5a, 6a) swingably mounted to the wheel carrying member (1) and the other end (5b, 6b) swingably supported by the vehicle body, while being installed to extend in a vehicle widthwise direction; and a lower link (7) having one end mounted to a lower portion of the wheel carrying member (1) at a position rearward of a rotary shaft (S) of the wheel, and the other end swingably supported by the vehicle body, wherein: the one ends (5a, 6a) of the upper and lower lateral links (5, 6) are mounted, respectively, to an upper portion and a lower portion of the wheel carrying member (1) at positions frontward of the rotary shaft (S) of the wheel, wherein the upper and lower mounting portions (12, 16) each mounting a respective one of the upper and lower lateral links (5, 6) to the wheel carrying member (1) are disposed at approximately same positions in the vehicle longitudinal direction in side view; and the subframe (3) comprises a frame member, wherein each of opposite lateral ends of the frame member has an upwardly/downwardly extending section (31U, 31L) extending in an upward-downward direction in side view, and wherein the other ends (5b, 5b) of the upper and lower lateral links (5, 6) are supported, respectively, by an upper portion and a lower portion of the upwardly/downwardly extending section, wherein the upper and lower support portions (14, 18) each supporting a respective one of the upper and lower the lateral links (5, 6) to the frame member are disposed at approximately same positions in a vehicle longitudinal direction in side view.

In the present invention having the above feature, the one ends of the upper and lower lateral links each installed to extend in the vehicle widthwise direction are mounted, respectively, to an upper portion and a lower portion of the wheel carrying member at positions frontward of the rotary shaft of the wheel. The upper and lower mounting portions each mounting a respective one of the upper and lower lateral links to the wheel carrying member are disposed at approximately same positions in the vehicle longitudinal direction in side view. Further, the other ends of the upper and lower lateral links are supported, respectively, by an upper portion and a lower portion of the frame member installed to extend in an upward-downward direction in side view. The upper and lower support portions each supporting a respective one of the upper and lower lateral links to the frame member are disposed at approximately same positions in the vehicle longitudinal direction in side view. This provides an advantage of being able to allow a turning outer wheel (rear wheel located on an outer side during vehicle turning) to be biased in a toe-in direction during vehicle turning so as to effectively enhance vehicle steering stability.

In the vehicle suspension apparatus of the present invention, the frame member may be disposed to extend in the vehicle widthwise direction, wherein the frame member has a front cross member (31) which includes first and second front cross members (36, 37) installed to intersect to form an X shape in front view, and wherein the upper and lower lateral-link support portions (14, 18) are provided, respectively, at opposite right and left ends of each of the first and second cross members (36, 37).

According to this feature, the frame member is disposed to extend in the vehicle widthwise direction, and comprised of the front cross member including the first and second front cross members installed to intersect to form an X shape in front view. Further, the upper and lower lateral-link support portions are provided, respectively, at the opposite right and left ends of each of the first and second cross members. Thus, two loads input from the upper and lower lateral-link support portions into each of the first and second cross members can be effectively canceled out. This provides an advantage of being able to effectively support loads input from the right and left suspension members, while simplifying a structure of the front cross member.

Preferably, the above vehicle suspension apparatus comprises a pair of right and left side members (33) each extending from a respective one of opposite right and left edges of the front cross member (31), in the vehicle longitudinal direction, and a rear cross member (32) extending in the vehicle widthwise direction to couple respective rear portions of the side members (33), wherein the lower link (7) is swingably supported by the rear cross member (32).

According to this feature, the pair of right and left side members each extending from a respective one of the opposite right and left edges of the front cross member, in the vehicle longitudinal direction, and the rear cross member extending in the vehicle widthwise direction to couple respective rear portions of the side members, are provided, and the lower link is swingably supported by the rear cross member. This provides an advantage of being able to stably support a load input from the lower link into a frame member with a simple and compact configuration.

Preferably, in the vehicle suspension apparatus of the present invention, each of the mounting portions (12,16) and support portions (14,18) for the upper and lower lateral links (5,6) and a mounting portion (20) and a support portion (22) for the lower link (7) is provided with a rubber bush, wherein the rubber bush (21,23) provided in each of the mounting portion (20) and the support portion (22) for the lower link (7) has a hardness set to a highest value among all the rubber bushes, and the rubber bush (17,19) provided in each of the mounting portion (16) and the support portion (18) for the lower lateral link (6) has a hardness set to a lowest value among all the rubber bushes.

According to this feature, each of the mounting portions and support portions for the upper and lower lateral links and the mounting portion and support portion for the lower link is provided with a rubber bush, wherein the hardness of the rubber bush provided in each of the mounting portion and the support portion for the lower link is set to the highest value, and the hardness of the rubber bush provided in each of the mounting portion and the support portion for the lower lateral link is set to the lowest value. Thus, the lateral link disposed below and frontward of the rotary shaft of the wheel can be most largely elastically deformed to allow a turning outer wheel to be more effectively displaced to a toe-in position during vehicle turning.

The vehicle suspension apparatus of the present invention may comprise a stabilizer (10) installed to the frame member to extend in the vehicle widthwise direction so as to couple a bilateral pair of the wheel suspension members (2) together, wherein the stabilizer (10) has opposite right and left ends each coupled to a respective one of the lower links (7) through a coupling link (25).

According to this feature, a stabilizer is installed to the frame member to extend in the vehicle widthwise direction so as to couple the right and left wheel suspension members together, and each of the right and left ends of the stabilizer is coupled to a respective one of the lower links through the coupling link. This provides an advantage of being able to adequately install the coupling link by effectively utilizing a space formed on a rear side of the wheel carrying member based on the arrangement where the upper lateral link is disposed frontward of the wheel carrying member.

The vehicle suspension apparatus of the present invention may comprise a shock absorber (8) installed to extend in an upward-rearward direction at a position rearward of the rotary shaft (S) of the wheel, wherein the shock absorber (8) has a lower end mounted to the wheel carrying member (1).

According to this feature, a shock absorber is installed to extend in an upward-rearward direction at a position rearward of the rotary shaft of the wheel, and the lower end of the shock absorber is mounted to the wheel carrying member, so that it becomes possible to sufficiently ensure an installation space of the shock absorber by effectively utilizing the space formed on the rear side of the wheel carrying member 1 based on the arrangement where the upper lateral link is disposed frontward of the wheel carrying member. In addition, it is not necessary to change an installation position of the shock absorber between a rear-wheel-drive or four-wheel-drive vehicle having a need for transmitting a driving force of an engine to rear wheels, and a front-wheel-drive vehicle free of the need for transmitting a driving force of an engine to rear wheels, so that it becomes possible to allow the suspension apparatus to have versatility as a rear-wheel suspension apparatus.

Preferably, in the above vehicle suspension apparatus, the shock absorber (8) is installed in a frontwardly inclined posture.

According to this feature, the shock absorber is installed in a frontwardly inclined posture by utilizing the space formed on the rear side of the wheel carrying member. This provides an advantage of effectively enhance vehicle ride quality with a simple configuration, by using the shock absorber as a damping member against up-and-down vibration input from a rear wheel suspension member.

This application is based on Japanese Patent Application Serial No. 2010-150049 filed in Japan Patent Office on Jun. 30, 2010 the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A vehicle suspension apparatus comprising:
   a wheel carrying member adapted to rotatably carry a wheel;
   a trailing arm having one end mounted to the wheel carrying member and the other end swingably supported by a vehicle body, while being installed to extend in a vehicle longitudinal direction;
   a subframe adapted to couple right and left wheels together;
   an upper lateral link and a lower lateral link each having one end swingably mounted to the wheel carrying member and the other end swingably supported by the vehicle body, while being installed to extend in a vehicle widthwise direction; and
   a lower link having one end mounted to a lower portion of the wheel carrying member at a position rearward of a rotary shaft of the wheel, and the other end swingably supported by the vehicle body,
   wherein:
   said one ends of the upper and lower lateral links are mounted, respectively, to an upper portion and the lower portion of the wheel carrying member at positions frontward of the rotary shaft of the wheel, the upper and lower mounting portions each mounting a respective one of the upper and lower lateral links to the wheel carrying member are disposed at approximately same positions in the vehicle longitudinal direction in side view;
   the subframe comprises a frame member, each of opposite lateral ends of the frame member having an upwardly/downwardly extending section extending in an upward-downward direction in side view,
   said other ends of the upper and lower lateral links are supported, respectively, by an upper support portion and a lower support portion of the upwardly/downwardly extending section, the upper and lower support portions each supporting a respective one of the upper and lower the lateral links to the frame member are disposed at approximately same positions in the vehicle longitudinal direction in side view,
   each of the mounting portions and support portions for the upper and lower lateral links and a mounting portion and a support portion for the lower link is provided with a rubber bush,
   wherein the rubber bush provided in each of the mounting portion and the support portion for the lower link has a hardness set to a highest value among all the rubber bushes,
   the rubber bush provided in each of the mounting portion and the support portion for the lower lateral link has a hardness set to a lowest value among all the rubber bushes, and
   the rubber bush provided in each of the mounting portion and the support portion for the upper lateral link has a hardness set to an intermediate value between said highest value and said lowest value.

2. The vehicle suspension apparatus as defined in claim 1, wherein the frame member is disposed to extend in the vehicle widthwise direction, the frame member having a front cross member which includes first and second front cross members installed to intersect to form an X shape in front view, wherein the upper and lower lateral-link support portions are provided, respectively, at opposite right and left ends of each of the first and second cross members.

3. The vehicle suspension apparatus as defined in claim 2, further comprising a pair of right and left side members each extending from a respective one of opposite right and left edges of the front cross member, in the vehicle longitudinal direction, and a rear cross member extending in the vehicle widthwise direction to couple respective rear portions of the side members, wherein the lower link is swingably supported by the rear cross member.

4. The vehicle suspension apparatus as defined in claim 3, further comprising a stabilizer installed to the frame member to extend in the vehicle widthwise direction so as to couple a bilateral pair of the wheel suspension members together, the stabilizer having opposite right and left ends each coupled to a respective one of the lower links through a coupling link.

5. The vehicle suspension apparatus as defined in claim 4, further comprising a shock absorber installed to extend in an upward-downward direction at a position rearward of the rotary shaft of the wheel, the shock absorber having a lower end mounted to the wheel carrying member.

6. The vehicle suspension apparatus as defined in claim 5, wherein the shock absorber is installed in a frontwardly inclined posture.

7. The vehicle suspension apparatus as defined in claim 3, further comprising a shock absorber installed to extend in an upward-downward direction at a position rearward of the rotary shaft of the wheel, the shock absorber having a lower end mounted to the wheel carrying member.

8. The vehicle suspension apparatus as defined in claim 7, wherein the shock absorber is installed in a frontwardly inclined posture.

9. The vehicle suspension apparatus as defined in claim 2, further comprising a stabilizer installed to the frame member to extend in the vehicle widthwise direction so as to couple a bilateral pair of the wheel suspension members together, the stabilizer having opposite right and left ends each coupled to a respective one of the lower links through a coupling link.

10. The vehicle suspension apparatus as defined in claim 9, further comprising a shock absorber installed to extend in an upward-downward direction at a position rearward of the rotary shaft of the wheel, the shock absorber having a lower end mounted to the wheel carrying member.

11. The vehicle suspension apparatus as defined in claim 10, wherein the shock absorber is installed in a frontwardly inclined posture.

12. The vehicle suspension apparatus as defined in claim 2, further comprising a shock absorber installed to extend in an upward-downward direction at a position rearward of the rotary shaft of the wheel, the shock absorber having a lower end mounted to the wheel carrying member.

13. The vehicle suspension apparatus as defined in claim 12, wherein that the shock absorber is installed in a frontwardly inclined posture.

14. The vehicle suspension apparatus as defined in claim 1, further comprising a stabilizer installed to the frame member to extend in the vehicle widthwise direction so as to couple a bilateral pair of the wheel suspension members together, the stabilizer having opposite right and left ends each coupled to a respective one of the lower links through a coupling link.

15. The vehicle suspension apparatus as defined in claim 14, further comprising a shock absorber installed to extend in an upward-downward direction at a position rearward of the rotary shaft of the wheel, the shock absorber having a lower end mounted to the wheel carrying member.

16. The vehicle suspension apparatus as defined in claim 15, wherein the shock absorber is installed in a frontwardly inclined posture.

17. The vehicle suspension apparatus as defined in claim 1, further comprising a shock absorber installed to extend in an upward-downward direction at a position rearward of the rotary shaft of the wheel, the shock absorber having a lower end mounted to the wheel carrying member.

18. The vehicle suspension apparatus as defined in claim 17, wherein the shock absorber is installed in a frontwardly inclined posture.

* * * * *